(12) United States Patent
Cheung et al.

(10) Patent No.: US 8,081,216 B2
(45) Date of Patent: Dec. 20, 2011

(54) LIGHTING CONTROL SYSTEM AND METHOD

(75) Inventors: Chi Hang Cheung, New Territories (HK); Shan Mei Wan, New Territories (HK); Kai Chiu Wu, New Territories (HK); Ming Lu, New Territories (HK)

(73) Assignee: Hong Kong Science and Technology Research Institute Co., Ltd., Hong Kong (CN)

( * ) Notice: Subject to any disclaimer, the term of this patent is extended or adjusted under 35 U.S.C. 154(b) by 428 days.

(21) Appl. No.: 12/411,585

(22) Filed: Mar. 26, 2009

(65) Prior Publication Data
US 2010/0244708 A1    Sep. 30, 2010

(51) Int. Cl.
*H04N 5/225* (2006.01)
*H05B 37/02* (2006.01)

(52) U.S. Cl. ........ 348/207; 348/143; 340/541; 340/552; 340/565; 340/567; 315/149; 315/156; 315/158; 315/159

(58) Field of Classification Search .............. 315/185 R, 315/149, 158, 294; 362/11, 235, 295; 348/65, 348/68, 69, 77, 135, 207, 143, 373; 340/541, 340/552, 548, 565, 567
See application file for complete search history.

(56) References Cited

U.S. PATENT DOCUMENTS

| | | | | |
|---|---|---|---|---|
| 5,701,058 A | * | 12/1997 | Roth | 315/158 |
| 6,095,661 A | * | 8/2000 | Lebens et al. | 362/184 |
| 6,188,182 B1 | * | 2/2001 | Nickols et al. | 315/294 |
| 6,340,864 B1 | | 1/2002 | Wacyk | |
| 6,583,573 B2 | * | 6/2003 | Bierman | 315/149 |
| 7,177,537 B1 | * | 2/2007 | Adolphi et al. | 396/4 |
| 7,255,457 B2 | * | 8/2007 | Ducharme et al. | 362/231 |
| 7,321,385 B2 | * | 1/2008 | Rus et al. | 348/69 |
| 2002/0015097 A1 | | 2/2002 | Martens et al. | |
| 2010/0063641 A1 | * | 3/2010 | Scholten | 700/287 |

FOREIGN PATENT DOCUMENTS

| | | |
|---|---|---|
| DE | 19825837 A1 | 12/1999 |
| JP | 7045370 A | 2/1995 |

OTHER PUBLICATIONS

International Searching Authority, Notification of Transmittal of the International Search Report and the Written Opinion of the International Searching Authority, or the Declaration for the corresponding PCT Application No. PCT/CN2009/071028 mailed Jul. 23, 2009.

* cited by examiner

*Primary Examiner* — Vibol Tan
(74) *Attorney, Agent, or Firm* — Brooks Kushman P.C.

(57) ABSTRACT

A lighting control system for controlling the lighting of a predetermined area is provided. According to one embodiment, the lighting control system comprises one or more light sources positioned in the predetermined area, the light source configured to include adjustable light intensity; a camera positioned and configured to capture an image of the predetermined area; and a controller in operable communication with the one or more light sources and the camera, the controller configured to control the one or more light sources and adjust the light intensity of the light source. The controller is configured to operate in a closed control loop to automatically adjust the lighting conditions of a predetermined area or environment. A false alarm checking process checks for temporary or localized events to prevent unnecessary lighting adjustments.

19 Claims, 6 Drawing Sheets

LIGHTING CONTROL SYSTEM AND METHOD

FIELD OF THE INVENTION

The present invention relates to a lighting control system and method, and more particularly, to an active lighting control system for light intensity control and hue correction.

BACKGROUND OF THE INVENTION

Conventionally, a light source, such as a light or a number of lights, is connected to a light switch for illuminating a room or other space. The switch is operated by a user to turn the light source on and off. The light source may have either a fixed intensity or a switch that must be controlled by the user to adjust the light intensity.

It is desirable in homes and other modern buildings to provide an aesthetically pleasing environment through the use of active, automatically controlled and sophisticated lighting systems that provide the desired lighting conditions without requiring a large amount of user control. Therefore, a number of automatic lighting control systems have been developed.

Some of these lighting control systems have the disadvantage of requiring a large number of sophisticated light sensors, resulting in increased costs. Additionally, if any of the sensors is blocked or not functioning properly, the entire control system may not function properly. These systems also regularly require specialized equipment installed according to detailed specifications, which can require substantially amounts of time, effort, and expense.

Accordingly, there is a need for a lighting control system that overcomes these and other shortcomings of existing lighting control systems while providing the desired benefits of an active lighting control system.

SUMMARY OF THE INVENTION

According to one embodiment of the present invention, a lighting control system for controlling the lighting of a predetermined area is disclosed. The lighting control system includes one or more light sources positioned in the predetermined area, the light source configured to include adjustable light intensity; a camera positioned and configured to capture an image of the predetermined area; a controller in operable communication with the one or more light sources and the camera, the controller configured to control the one or more light sources and adjust the light intensity of the light source, the controller further configured to capture a current image of the predetermined area, the controller further configured to initialize a reference image and compare a target area of the reference image to a target area of the current image to determine a whether the lighting conditions are within a predetermined acceptable range, and perform a false alarm check if the lighting conditions exceed the predetermined acceptable range; issue a light control signal when the lighting conditions exceed the predetermined acceptable range, the light control signal including instructions for adjusting the lighting system; and adjust the lighting system according to instructions.

According to another embodiment of the present invention, a method for control of a lighting control system, the lighting control system including one or more cameras for capturing images and a lighting system including one or more light sources, the lighting system configured to deliver light to a predetermined area. The method includes capturing and initializing a reference image; capturing a current image of the predetermined area; comparing a target area of the reference image to a target area of the current image to determine whether the lighting conditions are within a predetermined acceptable range, and performing a false alarm check if the lighting conditions exceed the predetermined acceptable range; issuing a light control signal when the lighting conditions exceed the predetermined acceptable range, the light control signal including instructions for adjusting the lighting system; and adjusting the lighting system according to instructions.

According to another embodiment of the present invention, a method for controlling a lighting system of a predetermined area is disclosed. The method includes providing at least one monitoring device to capture at least one image of the predetermined area; providing a lighting system having a plurality of uniquely addressable light sources, each of the plurality of light sources having a wireless transceiver configured to transmit and receive wireless signals, and each of the plurality of light sources having adjustable light output; providing a control system configured to analyze image data, the image data generated from the captured at least one image of the predetermined area, and using the image data to generate a lighting control signal, the lighting control signal including instructions for adjusting the light output of at least one of the plurality of light sources; and adjusting at least one of the plurality of light sources in response to the lighting control signal.

Still other embodiments of the present invention will become readily apparent to those skilled in the art from the following detailed description, wherein embodiments of the invention are described by way of illustration. As will be realized, the invention is capable of other and different embodiments and its several details are capable of modifications in various respects, all without departing from the spirit and the scope of the present invention.

DETAILED DESCRIPTION

In the following description, reference is made to the accompanying drawings where, by way of illustration, specific embodiments of the invention are shown. It is to be understood that other embodiments may be used as structural and other changes may be made without departing from the scope of the present invention. Also, the various embodiments and aspects from each of the various embodiments may be used in any suitable combinations. Accordingly, the drawings and detailed description are to be regarded as illustrative in nature and not as restrictive. Like elements in each of the figures are referred to by like reference numbering.

Generally, embodiments of the present invention are directed to a lighting control system and method for controlling the lighting of a predetermined area. According to one embodiment, the lighting control system includes a camera, a lighting system, and a controller configured to control the lighting system and automatically adjust the lighting conditions of a predetermined area or environment. Image processing is used to compare a target area of captured images to the target area of a reference image. The reference image representing the preferred lighting conditions of the predetermined area. Any suitable imaging processing method may be used such as, for example, a computer with memory, a central processing unit, and other required hardware and software required to execute the image processing instructions.

Figure 1:
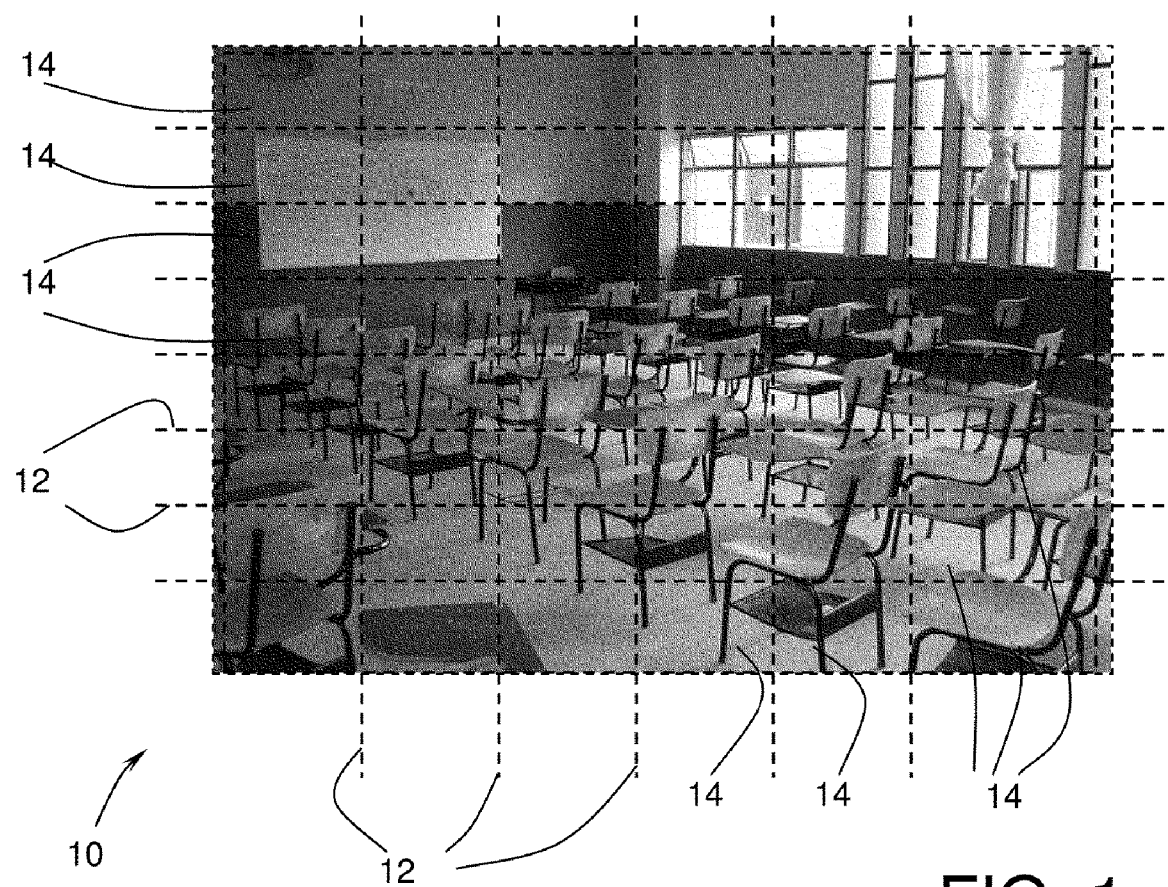
FIG. 1 is an example image of a predetermined area showing an example grid representation of the example image, in accordance with an embodiment of the present invention.

Referring now to FIG. 1, an image 10 of a predetermined area showing an example grid representation of the example image, in accordance with an embodiment of the present invention, is shown. The image 10 of the predetermined area showing an example data grid 12 representation of the image 10, in accordance with an embodiment of the present invention. The data grid is divided into a plurality of blocks 14. Each of the blocks 14 in the data grid 12 represents a portion of the predetermined area captured by the camera. The data inside each block 14 of the data grid 12 is averaged for further processing. The data may then be compared to the data representing a reference image.

Figure 2:
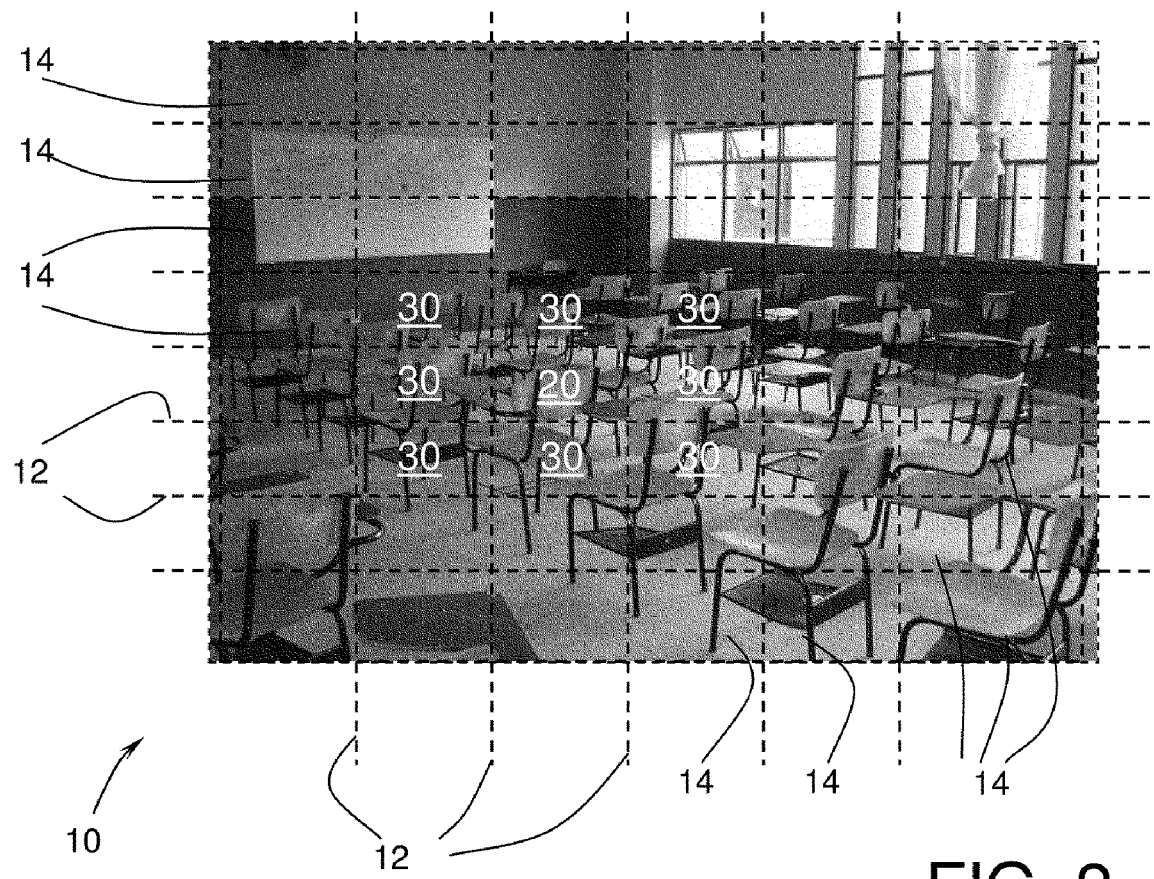
FIG. 2 is the example image of the predetermined area shown in FIG. 1 indicating a target area and a neighboring area, in accordance with an embodiment of the present invention.

FIG. 2 is the example image of the predetermined area shown in FIG. 1 indicating a target area 20 and a neighboring area 30, in accordance with an embodiment of the present invention. In the example image 10, the target area 20 is indicated as being a single block in the data grid. However, according to another embodiment of the present invention, the target area may include one or more blocks of the data grid 12. In an embodiment of the present invention where the target area includes two or more blocks of the data grid 12, the two or more blocks are contiguous with each other, such that the target area relates to a general location in the predetermined area. Also, the example image 10 may include two or more target areas, such as two or more non-contiguous data blocks located in separated locations in the image of the predetermined area.

In the example image 10, the neighboring area 30 includes a plurality of data blocks surrounding the target area 20. However, according to another embodiment of the present invention, the neighboring area may include only one data block that is proximate to the target area 20 of the predetermined area. According to another embodiment of the present invention, the neighboring area may include two or more data blocks that are proximate to the target area 20 of the predetermined area. In the illustrated example of FIG. 2, the neighboring area 30 is proximate to the target area 20. However, the neighboring area need not be touching or contiguous with the target area 20 but may include data blocks that are separated from the target area 20 by a predetermined distance.

Figure 3:
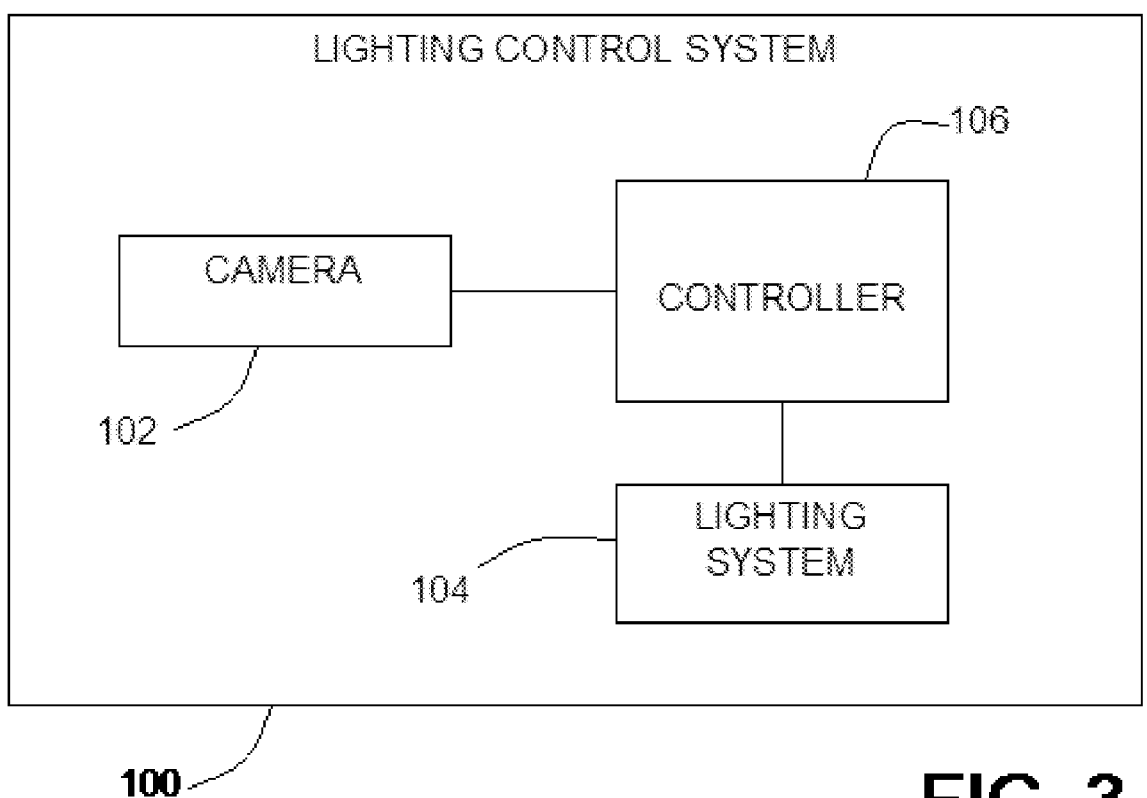
FIG. 3 is a block diagram of a lighting control system, in accordance with an embodiment of the present invention.

FIG. 3 is a block diagram of the lighting control system 100, in accordance with an embodiment of the present invention. The lighting control system 100 includes at least one camera 102, a lighting system 104 including one or more light sources, and a controller 106. The camera 102 may be any camera, such as a photographic camera, digital camera, video camera, optical sensor, or any type of monitoring device used to capture images. To leverage existing resources, presently existing camera equipment, such as a security camera or security system, may also be used. The lighting system 104 may include any desired number of light sources. In one embodiment, if more than one light source is used, each of the light sources may be uniquely addressable so that they may be controlled independently to provide greater control over the lighting environment.

In one embodiment, the controller 106 may be any type of electronic control device including programmable logic that is configured to receive an image from the camera 102 and is further configured to transmit and receive signals to and from the lighting system 104. The controller 106 may include a microcontroller unit or a microprocessor configured to process the signals and operating instructions, which may be programmable logic or computer executable instructions stored on any suitable computer readable storage medium. Signals may be transmitted between the various components of the lighting control system 100 by wired or wireless methods. The signals may be transmitted directly or indirectly through other devices or systems.

In one embodiment, the controller 106 sends the lighting control signal to the lighting system 104. The lighting control signal can be any command or instruction in any standard lighting control communication protocol such as, for example, DMX communication format. The lighting control signal can be used to change the light intensity, dimming level, color or CCT (correlated color temperature) of the corresponding light sources.

According to one embodiment, the controller 106 may be a personal computer or any computer system configured for operable communication with the components of the lighting control system 100 and capable of performing the required functions. An example computer includes a central processing unit, one or more memories for storing and executing computer program instructions, ports or wireless communications devices, such as infrared or radio devices using, for example, Bluetooth, infrared, Wi-Fi or Zigbee, for connecting with other devices, and the required buses and architecture for operation of the computer. The computer may be part of a network, or configured as a stand-alone system. The various applications and logic instructions may be run on a network server or locally on the computer system.

Figure 4:
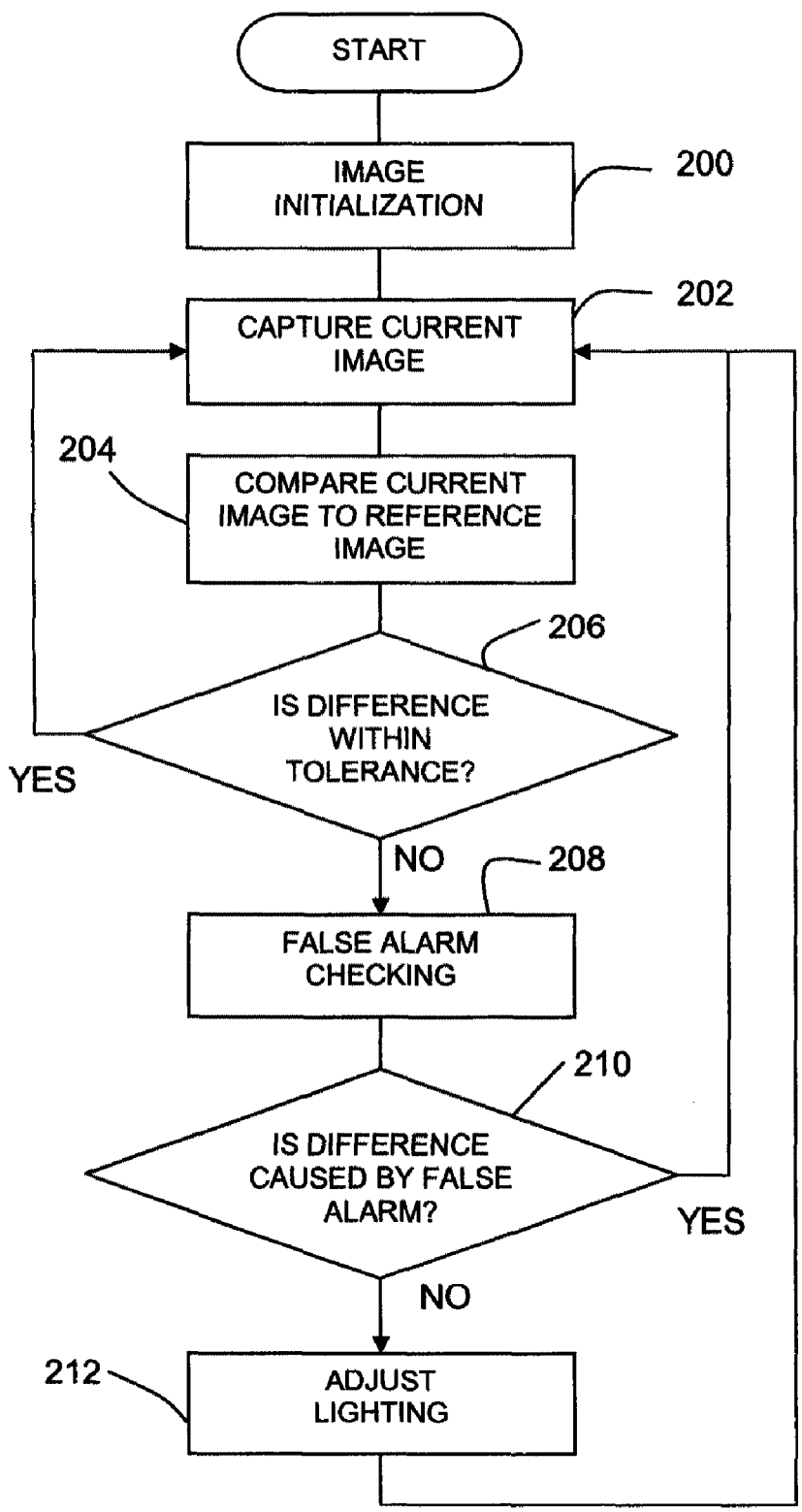
FIG. 4 is a flow diagram of a light control process, in accordance with an embodiment of the present invention.

FIG. 4 is a flow diagram of a lighting control process, in accordance with an embodiment of the present invention. In step 200, an image initialization process is performed to, among other steps, create a reference image. The image initialization process is described in detail with reference to FIG. 5. In step 202, the camera is used to capture a current image of the predetermined area. In step 204, the captured camera image is mapped using image processing so that the captured image can be compared to the reference image.

Each image referred to in the process flow diagrams refers to image data that is generated from the images captured by the camera. The image data may be generated by using any suitable program such as Photoshop or GIMP (GNU image manipulation program) or any image process program or software, or by using any hardware such as DSP (Digital Signal Processor) or the microprocessor. The data can be extracted from the image such as RGB, CMYK, hue or gray scale. In one example embodiment of the image processing, an image is first captured using the camera, and then the image is converted into the grid for further processing.

In step 204, the current image is compared to the reference image, creating a comparison value. In decision step 206, the lighting control system determines if the current image, which represents the current lighting conditions, when compared to the reference image, which represents the desired lighting conditions, results in a comparison value that is within a predetermined tolerance. If the comparison value is within the predetermined tolerance, then the process returns to step 202, and another current image is captured. There may be a predetermined delay between step 206 and a repetitive iteration of steps 202 through 206 in order to conserve computing or electrical resources, or these steps may be repeated continuously. If the comparison value exceeds the predetermined tolerance, which is referred to as a tolerance exception, then the system proceeds to the false alarm checking, step 208. The comparison value exceeding the tolerance is an indication that the lighting conditions outside of a predetermined acceptable range, when compared to the desired lighting conditions, which were established and identified in the reference image. However, false alarm checking is required to make sure tolerance exception was caused by a real change in the lighting conditions and not an aberration or abnormal interference with the operation of the lighting control system. For example, the lighting system may be temporarily blocked, the target area may be blocked, or the outside light source may be blocked temporarily. The false alarm checking process is described in detail with reference to FIG. 6. In decision step 210, if the tolerance exception is caused by a false alarm, then the process returns to step 202. If the tolerance exception is not a false alarm, then there has been a change in the lighting conditions and the controller 106 takes steps to adjust the lighting, step 212.

In step 212, if the target area of the captured image has lower light intensity or CCT value than of the target area of the reference image, the controller 106 will adjust the light intensity or CCT value of the light sources corresponding to the target area. This adjustment will result in a light intensity that is the same or similar as that in the reference image. Adjustment operations are similarly performed if the target area of the captured image has higher light intensity or CCT value than that of the target area of the reference image.

After adjusting the lighting, the system returns to step 202, where another current image is captured and the process is repeated until the captured image data is within the predetermined acceptable range when compared to the desired lighting conditions. Accordingly, the lighting control system operates in a closed control loop to repeatedly check the lighting conditions. According to an embodiment of the present invention, this adjustment process may be repeated as many times as necessary.

Figure 5:
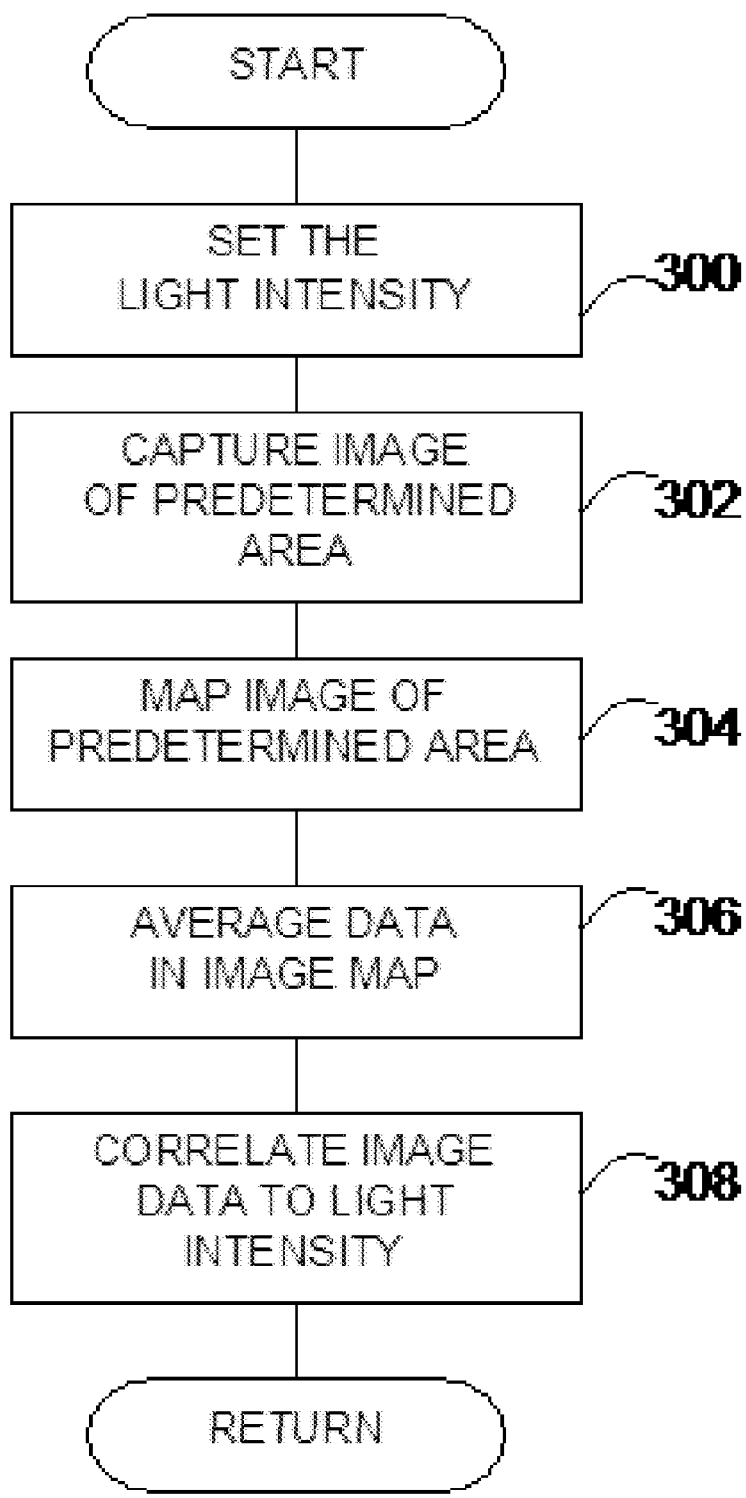
FIG. 5 is a flow diagram of an image initialization process, in accordance with an embodiment of the present invention.

FIG. 5 is a flow diagram of an image initialization process, in accordance with an embodiment of the present invention. Image initialization acts as a calibration process for any given predetermined area or location. During the image initialization process, the reference image is determined by either the user or automatically by the control system, which may be programmed to calculate a reference image according to certain parameters and preferences. The reference image reflects the preferred lighting conditions of the predetermined area. The lighting conditions may include, for example, light intensity, contrast, hue, CCT, and color control. Image initialization also includes the step of identifying the target area and correlating the target area to the light sources that will affect the lighting conditions of the target area. For example, if the target area includes multiple light sources, a determination will be made on how each of the light sources affects the target area, and thereby how each of the light sources affects the data of a captured image.

Referring now to the FIG. 5, in step 300, the light intensity of the predetermined area and/or the target area is set. In step 302, the camera captures an image of the predetermined area. In step 304, the captured image is mapped to image data, such as a data grid. In step, 306, each section of the image data is averaged to generate data for processing. In step 308, the image data is correlated to the light sources so that changes in the light sources will result in generally predictable changes in the image data.

Figure 6:
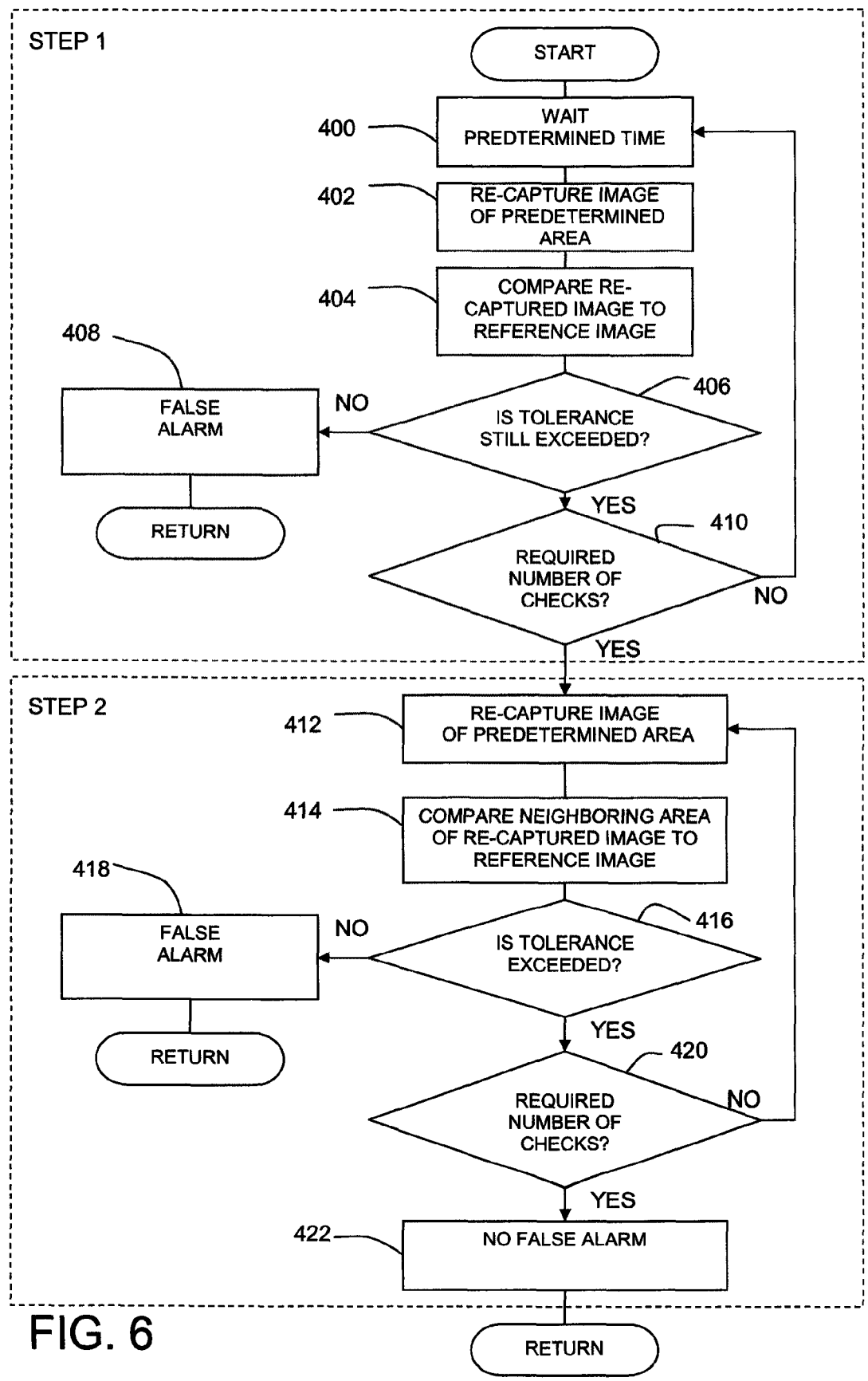
FIG. 6 is a flow diagram of a false alarm checking process, in accordance with an embodiment of the present invention.

FIG. 6 is a flow diagram of a false alarm checking process, in accordance with one embodiment of the present invention. As described with reference to FIG. 4, the false alarm checking process begins when the comparison value exceeds the predetermined tolerance, possibly indicating a need for lighting adjustment. After a false alarm determination is made, the system returns to the process described with reference to FIG. 4.

The process flow diagram of FIG. 6 is separated into step 1, including steps 400 to 410, and step 2, including steps 412 to 422. Each of these steps is configured to check for a different condition that could possibly be a false alarm. Therefore, if either of these conditions exists, then the actual lighting conditions have not changed and no adjustment of the lighting is required. Step 1 is configured to check for a temporary blocking condition, blockage of one or more of the light sources, blockage of the outside light, interference with the camera, or any other temporary condition. Step 2 checks for conditions that have changed the target area being monitored, and not necessarily the overall lighting environment, by checking the conditions of a neighboring area, or an area proximate to the target area. Each step may be used separately or in any combination. Either or both of step 1 and step 2 may also be used with other steps to check for other false alarm conditions.

In step 400, the control system waits a predetermined amount of time before rechecking the comparison value. This amount of time can be any desired value, such as second or minutes, or other smaller units of time for faster processing. However, the unit of time works in conjunction with step 410, which requires a certain number of these time periods to pass before a false alarm will be found. In step 402, after the predetermined amount of time passes, the system will recapture an image of the predetermined area. If a temporary condition was causing the tolerance exception, it's possible that the temporary condition will pass after a certain amount of time. In step 404, using image processing, the recaptured images is compared to the reference image to recalculate the comparison value. In decision step 406, the control system determines if the comparison value still exceeds the predetermined tolerance after the predetermined period of time has passed. If no, then the process continues to step 408, signaling a false alarm. Whatever condition resulted in the tolerance exception has passed, and no real change in the lighting environment has occurred. If yes, then in decision step 410, a counter is incremented and the system determines if the counter has exceeded a predetermined number of false alarm checks. If no, then the system returns to step 400. If yes, then the control system proceeds to Step 2 of the false alarm checking process.

In step 412, the neighboring area of the target area is checked. In step 414, the neighboring area captured image is compared to the neighboring area of the reference image to calculate a comparison value of the neighboring area. In decision step 416, the system determines if the comparison value of the neighboring area exceeds the predetermined tolerance. If not, then the system signals a false alarm and returns to the control system process of FIG. 4, step 418. This false alarm signal indicates that the lighting conditions of the neighboring area are within the predetermined tolerance, and therefore there is likely not an actual change in the current lighting conditions. If the comparison value of the neighboring area does exceed the predetermined tolerance, then a counter is incremented and the system determines if the counter has exceeded a predetermined number of false alarm checks, step 420. If no, then the system returns to step 412. If yes, then there is no false alarm and the system generates a light control signal and returns to the process of FIG. 4 where the lighting is adjusted, step 422.

The comparison value may be one value or a plurality of values depending on the data being compared. For example, if two or more target areas are being compared, then two or more comparison values may be use, one comparison value for each of the two or more target areas. However, the two or more comparison values may further be processed to identify a single combined comparison value.

The lighting control system processes may be used to monitor and adjust any desired lighting conditions including, for example, light intensity, hue, contrast, and color. During the light adjustment process, the lighting control system may analyze the captured image data and use the image data to generate the lighting control signal. The lighting control signal includes instructions on how to adjust the lighting system. In one embodiment, in analyzing the captured image data, the lighting control system identifies one or more target areas of the image that exceeds the predetermined acceptable range and makes adjustments to the specific light sources of the lighting system that will affect a change in the lighting in these one or more discrete areas.

According to one embodiment, each of the images captured by the camera is an aerial image. However, an image from any vantage point may be used. Specifically, security or other monitoring cameras are generally in an elevated location that captures a perspective, comprehensive view of a location. These views may be especially suited for use with embodiments of the present invention. According to one embodiment, two or more cameras may be used to capture more data on the lighting environment of the predetermined area. The views of two or more cameras may be combined for generate a single set of image data.

One advantage of the embodiments of the present invention is that the lighting control system can control the lighting more accurately and stably due to the use of false alarm checking. With the false alarm checking, incorrect lighting control due to some abnormal situations can be avoided.

One advantage of embodiments of the present invention is that greater light uniformity may be provided. The use of image processing in the lighting control process results in greater uniformity. Additionally, embodiments of the present invention are not limited to a specific type of equipment or specialized photo-optical sensor. Instead, embodiments of the present invention can also use images captured by conventional cameras and camera systems.

While the invention has been particularly shown and described with reference to the illustrated embodiments, those skilled in the art will understand that changes in form and detail may be made without departing from the spirit and scope of the invention. For example, while embodiments of the present invention have been described with a single camera and a single image captured for analysis, embodiments of the present invention may similarly use multiple camera and multiple images, captured from one or more of the cameras being used. Also, while some values and criteria are described as predetermined, these values and criteria may also be variable and adjustable either by the user or automatically in response to changes in the lighting conditions or desired performance of the system.

Accordingly, the above description is intended to provide example embodiments of the present invention, and the scope of the present invention is not to be limited by the specific examples provided.

What is claimed is:

1. A lighting control system for controlling the lighting condition of a predetermined area, the lighting control system comprising:
   one or more light sources positioned in the predetermined area, each of the one or more light sources configured to include adjustable light intensity;
   two or more cameras, each camera positioned and configured to capture an image of the predetermined area;
   a controller in operable communication with the one or more light sources and the cameras, the controller configured to control the one or more light sources and adjust the light intensity of the one or more light sources, the controller further configured to receive a current image of the predetermined area from at least two of the cameras and use the data from the current images, the controller further configured to initialize a reference image and compare a target area of the reference image to a target area of any of the current images to determine whether the lighting condition is within a predetermined acceptable range, and perform a false alarm check if the lighting condition exceeds the predetermined acceptable range; issue a light control signal when the lighting condition exceeds the predetermined acceptable range, the light control signal including instructions for adjusting the one or more light sources; and adjust the one or more light sources according to the instructions.

2. The lighting control system of claim 1, wherein the controller performs steps in a closed control loop, wherein the lighting condition is repeatedly checked and adjusted according to the reference image.

3. The lighting control system of claim 1, wherein at least one of the one or more light sources is configured for wireless communication with the controller.

4. The lighting control system of claim 1, wherein the initialize a reference image process includes setting the lighting in the predetermined area; capturing an image of the predetermined area; and processing the image of the predetermined area to correlate the lighting condition in the predetermined area to the one or more light sources.

5. The lighting control system of claim 1, wherein the false alarm check is at least a two step process including a first alarm check and a second alarm check, and wherein the first alarm check and the second alarm check are satisfied prior to adjustment of the one or more light sources.

6. The lighting control system of claim 1, wherein the controller is further configured to generate a comparison value based on the comparison of the target area of the reference image to the target area of a current image, and the comparison value is checked against a predetermined tolerance.

7. The lighting control system of claim 1, wherein at least one of the cameras is a security camera.

8. A method for control of a lighting control system, the lighting control system including two or more cameras for capturing images and a lighting system including one or more light sources, the lighting system configured to deliver light to a predetermined area, the method comprising:
   capturing and initializing a reference image;
   capturing a current image of the predetermined area from at least two of the cameras;
   comparing a target area of the reference image to a target area of any of the current images to determine whether the lighting condition of the target area is within a predetermined acceptable range, and performing a false alarm check if the lighting condition exceeds the predetermined acceptable range;

issuing a light control signal when the lighting condition exceeds the predetermined acceptable range, the light control signal including instructions for adjusting the one or more light sources; and adjusting the one or more light sources according to the instructions.

9. The method of claim 8, further comprising the step of generating a comparison value based on the comparison of the target area of the reference image to the target area of a current image, and checking the comparison value against a predetermined tolerance.

10. The method of claim 8, wherein the false alarm check is at least a two step process including a first alarm check and a second alarm check, and wherein the first alarm check and the second alarm check are satisfied prior to adjustment of the one or more light sources.

11. The method of claim 8, wherein capturing and initialization a reference image includes:

setting the lighting in the predetermined area;

capture an image of the predetermined area; and processing the image of the predetermined area to correlate lighting in the predetermined area to the one or more light sources.

12. The method of claim 8, wherein performing the false alarm check includes:

waiting a predetermined amount of time;

recapturing a current image;

comparing the target area of the recaptured current image to the target area of the reference image to determine whether the lighting condition is within a predetermined acceptable range; and checking a counter to determine if a predetermined number of checks have been performed.

13. The method of claim 12, wherein performing the false alarm check further includes:

comparing the neighboring area of the recaptured image to the neighboring area of the reference image to determine whether the lighting condition is within a predetermined acceptable range.

14. The method of claim 13, wherein performing the false alarm check further includes:

checking a counter to determine if a predetermined number of checks have been performed.

15. The method of claim 8, further comprising:

capturing a second current image of the predetermined area; and processing the current image and the second current image to generate image data.

16. A method for controlling lighting of a predetermined area, the method comprising:

providing two or more monitoring devices to capture at least two or more images of the predetermined area;

providing a lighting system having a plurality of uniquely addressable light sources, each of the plurality of light sources configured to transmit and receive wireless signals, and each of the plurality of light sources having adjustable light output;

providing a control system configured to analyze image data, the image data generated from the captured at least two or more images of the predetermined area, and using the image data to generate a lighting control signal, the lighting control signal including instructions for adjusting the light output of at least one of the plurality of light sources; and adjusting at least one of the plurality of light sources in response to the lighting control signal.

17. The method of claim 16, further comprising the step of generating a comparison value based on the comparison of target area of the reference image to the target area of a current image, and checking the comparison value against a predetermined tolerance.

18. The method of claim 16, further comprising the step of performing a false alarm check, wherein the lighting control signal is generated after a completion of the false alarm check.

19. The method of claim 18, wherein the false alarm check is at least a two step process, including a first alarm check and a second alarm check, and wherein the first alarm check and the second alarm check are satisfied prior to adjustment of the one or more light sources.

* * * * *